United States Patent
Heinz et al.

Patent Number: 5,880,168
Date of Patent: Mar. 9, 1999

[54] OPEN-CELLED RIGID FOAMS BASED ON ISOCYANATE

[75] Inventors: Marion Heinz, Bernsdorf; Werner Wiegmann, Rahdem; Udo Rotermund, Ortrand; Anja Biedermann, Senftenberg; Michael Reichelt, Ruhland, all of Germany

[73] Assignee: BASF Aktiengesellschaft, Ludwigshafen, Germany

[21] Appl. No.: 159,924

[22] Filed: Sep. 24, 1998

[30] Foreign Application Priority Data

Sep. 24, 1997 [DE] Germany ............ 197 42 013.3

[51] Int. Cl.⁶ .................................. G08G 18/34
[52] U.S. Cl. ............................ 521/174; 521/131
[58] Field of Search ..................... 521/174, 131

[56] References Cited

U.S. PATENT DOCUMENTS 4,607,064  8/1986  Kuhn et al. ............... 521/174
4,789,690  12/1988  Milovanovic-Lerik et al. ..... 521/174

Primary Examiner—Morton Foelak
Attorney, Agent, or Firm—Fernando A. Borrego

[57] ABSTRACT

In a process for producing open-celled rigid foams by reacting a) polyisocyanates with b) compounds containing hydrogen atoms which are reactive toward isocyanates, in the presence of c) water, d) if desired, organic compounds acting as physical blowing agents, e) catalysts, auxiliaries and/or additives,
the compounds containing reactive hydrogen atoms used are substances having the structure I:

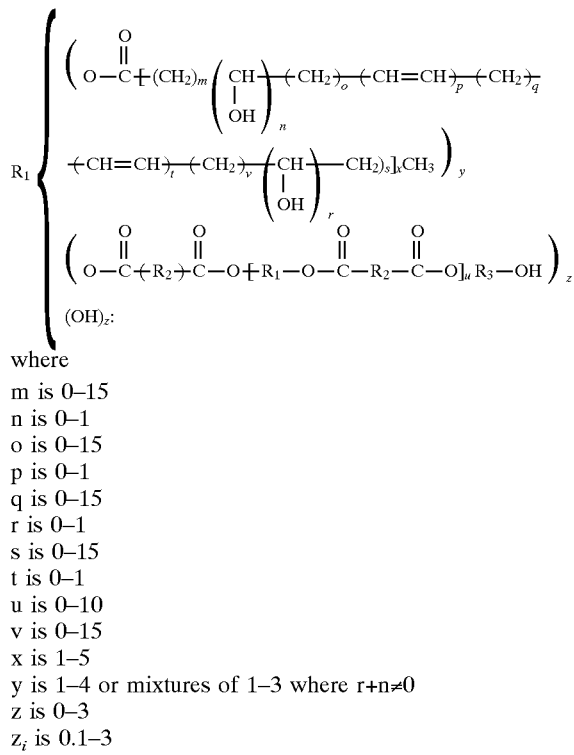

where
m is 0–15
n is 0–1
o is 0–15
p is 0–1
q is 0–15
r is 0–1
s is 0–15
t is 0–1
u is 0–10
v is 0–15
x is 1–5
y is 1–4 or mixtures of 1–3 where $r+n \neq 0$
z is 0–3
$z_i$ is 0.1–3

$R_1$ is an aliphatic structure without OH groups based on the structure of polyhydric alcohols, preferably ethylene glycol, diethylene glycol, triethylene glycol, 1,2-propylene glycol and dipropylene glycol, 1,4-butanediol, 1,6-hexanediol, neopentyl glycol, 1,3-butanediol, trimethylolpropane, trimethylolethane, glycerol, pentaerythritol, where these substances can also be used in the esterification as any mixture among one another and $R_1$ can therefore also be a mixture of the corresponding structures, $R_2$ is the radical of a polycarboxylic acid without COOH groups, eg. adipic acid, terephthalic acid, o-phthalic acid, $R_3$ is an alcohol radical like $R_1$.

15 Claims, No Drawings

OPEN-CELLED RIGID FOAMS BASED ON ISOCYANATE

The present invention relates to open-celled rigid foams based on isocyanate which are suitable, in particular, as core material in vacuum insulation units. The invention further provides auxiliaries for producing such rigid foams and also the vacuum insulation units produced using these open-celled rigid polyurethane foams.

The production of rigid foams based on isocyanate as thermal insulation material has been known for a long time. The most important starting materials here are polyfunctional isocyanates. Chemical structures formed from these polyisocyanates can be polyurethanes, polyureas, polyisocyanates and further isocyanate adducts such as allophanates, biurets, carbodiimides, oxazolidones, polyimides, polyamides, etc. The type of these structures is controlled by the reaction partners of the isocyanates, the catalysis and the reaction conditions. The rigid foams based on isocyanate which are produced by reacting polyisocyanates with polyols have the greatest industrial importance. The production of rigid polyurethane foams is described, for example, in the Kunststoffhandbuch, Volume VII, Polyurethane, edited by G. Oertel, Carl-Hanser-Verlag, Munich, Vienna, 1993.

The customary rigid foams based on isocyanate have predominantly closed cells in which cell gases having a low thermal conductivity are present. In the past, predominantly chlorofluorocarbons (CFCs), for example trichlorofluoromethane usually designated as R 11, were used for this purpose. The designation R 11 will hereinafter be used generally for chlorofluorocarbons.

However, these CFCs have a high ozone depletion potential (ODP) and a high global warming potential (GWP). For this reason, CFCs have in recent years been replaced by products having an ODP of zero and a very low GWP. Among the blowing agents which remain in the foam as cell gases after the reaction and which have an ODP of zero and a GWP of almost zero, hydrocarbons are of greatest importance. However, these substances lead to an increased thermal conductivity of the foams.

A series of possible methods of reducing the thermal conductivity are known from the prior art.

Thus, WO 95/15356 describes a process for producing rigid polyurethane foams which had closed, very small cells and contained IR absorbers, in particular carbon black to reduce the thermal conductivity. A disadvantage of the use of such solids as IR absorbers is, in particular, that they impair the processing of the polyol components and the isocyanate components to form the polyurethane, for example by settling or by blocking filters.

GB-A-2 286 134 proposes providing rigid polyurethane foams with IR-absorbing intermediate layers. However, the insertion of the layers requires additional steps and this process does not allow the customary, simple filling of hollow spaces with polyurethanes to provide thermal insulation.

A further possible way of overcoming this disadvantage is to evacuate the cells of the foam and thus to remove the blowing gases. This possibility is mentioned, for example, in R. De Vos, D. Dosbotham and J. Dechaght, 1994, SPI "Polyurethanes World Congress", Boston; W. Wacher, A. Christfreund, D. Randall, N. W. Keane, 1996, SPI "Polyurethanes Expo '96", Las Vegas. The strong thermally insulating action of vacuum in combination with fine-pored structures is generally known and has also been comprehensively examined theoretically, for example in the DVI-W ärmeatlas, 6th Edition, 1991, KF 1–KF 19 "Superisolationen". This theory indicates that the structures have to be as fine-pored as possible in order to minimize the demands made of the vacuum.

WO 95/00580 claims microcellular open-celled polyurethanes which are used, in particular, as core for vacuum insulation elements. The materials described there are produced in solution or by flocculation of an NCO-terminated prepolymer in water. Compared with conventional foaming, this method of production is considerably more complicated technically.

DE-A-44 39 328 describes vacuum panels having a core of polyurethane flocks which have been pressed together with a binder. Disadvantages here are the increased expense of producing the moldings and their high density of usually above 100 kg/m$^3$.

U.S. Pat. No. 5,478,867 describes the production of vacuum panels containing polyurea xerogels as core. However, the production of these xerogels is very time-consuming and costly.

EP-A-662 494 describes open-celled, rigid polyurethane foams for use in vacuum panels, which foams comprise urea compounds which can react with isocyanate as cell opener. However, these urea derivatives effect only insufficient cell opening, so that these foams have only limited suitability for vacuum panels.

EP-A-188 806 describes rigid polyurethane foams for vacuum panels, which foams have been produced using pulverulent carboxylates of divalent metals. However, the use of these solids in the liquid polyurethane formative components leads to the above-described problems in processing.

U.S. Pat. No. 4,444,821 describes vacuum panels which comprise glass fibers as core. EP-A-434 225 and U.S. Pat. No. 4,726,974 describe vacuum panels with silica filler. These variants too do not bring out the advantages of using polyurethanes.

It is an object of the present invention to provide open-celled, fine-celled rigid foams based on isocyanate which are suitable as core material for vacuum panels.

We have found that this object is achieved by reacting polyisocyanates with compounds containing reactive hydrogen atoms and having the formula I

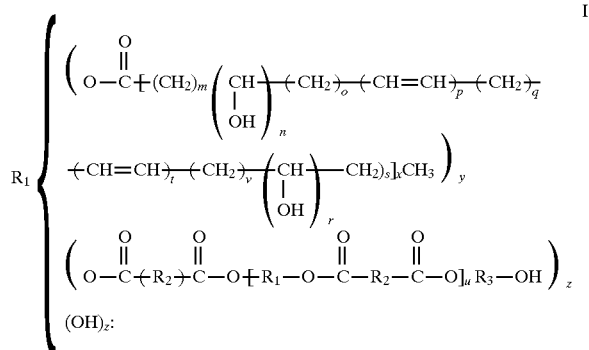

where
m is 0–15
n is 0–1
o is 0–15
p is 0–1
q is 0–15
r is 0–1
s is 0–15
t is 0–1 u is 0–10 v is 0–15 x is 1–5 y is 1–4 or mixtures of 1–3 where r+n≠0 z is 0–3

$z_i$ is 0.1–3

$R_1$ is an aliphatic structure without OH groups based on the structure of polyhydric alcohols, preferably ethylene glycol, diethylene glycol, triethylene glycol, 1,2-propylene glycol and dipropylene glycol, 1,4-butanediol, 1,6-hexanediol, neopentyl glycol, 1,3-butanediol, trimethylolpropane, trimethylolethane, glycerol, pentaerythritol, where these substances can also be used in the esterification as any mixture among one another and $R_1$ can therefore also be a mixture of the corresponding structures, $R_2$ is the radical of a polycarboxylic acid without COOH groups, eg. adipic acid, terephthalic acid, o-phthalic acid, $R_3$ is an alcohol radical like $R_1$.

The present invention accordingly provides a process for producing open-celled rigid foams based on isocyanate which are suitable for use as core material of vacuum insulation units by reacting a) polyisocyanates with b) compounds containing hydrogen atoms which are reactive toward isocyanates, in the presence of c) water, d) if desired, organic compounds acting as physical blowing agents, e) catalysts, auxiliaries and/or additives, wherein the compounds containing reactive hydrogen atoms used are substances having the following structure:

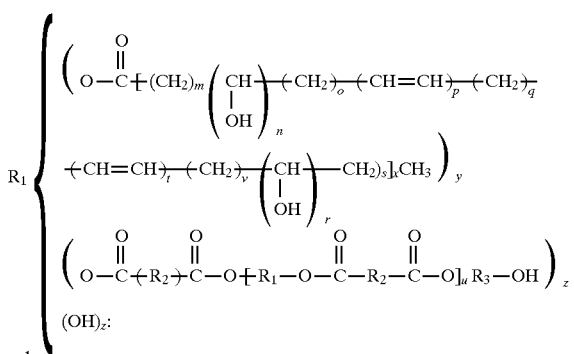

I where m is 0–15 n is 0–1 o is 0–15 p is 0–1 q is 0–15 r is 0–1 s is 0–15 t is 0–1 u is 0–10 v is 0–15 x is 1–5 y is 1–4 or mixtures of 1–3 where r+n≠0 z is 0–3

$z_i$ is 0.1–3

$R_1$ is an aliphatic structure without OH groups based on the structure of polyhydric alcohols, preferably ethylene glycol, diethylene glycol, triethylene glycol, 1,2-propylene glycol and dipropylene glycol, 1,4-butanediol, 1,6-hexanediol, neopentyl glycol, 1,3-butanediol, trimethylolpropane, trimethylolethane, glycerol, pentaerythritol, where these substances can also be used in the esterification as any mixture among one another and $R_1$ can therefore also be a mixture of the corresponding structures, $R_2$ is the radical of a polycarboxylic acid without COOH groups, eg. adipic acid, terephthalic acid, o-phthalic acid, $R_3$ is an alcohol radical like $R_1$.

The invention further provides the open-celled, fine-celled rigid foams based on isocyanate produced by this process and also the vacuum panels produced therefrom.

The compounds of formula I containing reactive hydrogen atoms which are used according to the present invention are preferably hydroxyl-containing esterification products of fatty acids and polyfunctional alcohols. It is possible here to use both saturated and unsaturated acids, with preference being given to using unsaturated compounds. Owing to the good compatibility with the other polyurethane formative components, preference is given to using reaction productions of ricinoleic acid and/or of castor oil and/or of tall oil fatty acid with polyfunctional alcohols. Polyfunctional alcohols used are, in particular, those having from 2 to 6 carbon atoms, preferably from 3 to 6 carbon atoms and particularly preferably from 3 to 5 carbon atoms, Examples are ethylene glycol, propylene glycol, diethylene glycol, dipropylene glycol, glycerol, butanediol. The hydroxyl number of the compounds of formula I containing active hydrogen is preferably >160 mg KOH/g.

The compounds containing reactive hydrogen atoms which are employed according to the present invention are used, in particular, in an amount of from 0.1 to 80% by weight, preferably from 5 to 50% by weight and particularly preferably 10–20% by weight, based on the total amount of the components b) to e).

As regards the other formative components, the following details may be provided:

a) Suitable organic polyisocyanates are the aliphatic, cycloaliphatic, araliphatic and preferably aromatic polyfunctional isocyanates known per se.

Particular preference is given to 2,4- and 2,6-tolylene diisocyanate and the corresponding isomer mixtures, diphenylmethane 4,4'-, 2,4'- and 2,2'-diisocyanate and the corresponding isomer mixtures, mixtures of diphenylmethane 4,4'- and 2,4'-diisocyanates, polyphenylpolymethylene polyisocyanates, mixtures of diphenylmethane 4,4'-, 2,4'- and 2,2'-diisocyanates and polyphenylpolymethylene polyisocyanates ("crude MDI"), and also mixtures of crude MDI and tolylene diisocyanates.

Use is frequently also made of modified polyfunctional isocyanates, ie. products which are obtained by chemical reaction of organic diisocyanates and/or polyisocyanates.

Examples which may be mentioned are polyisocyanates containing ester, urea, biuret, allophanate, carbodiimide, isocyanurate, uretdione and/or urethane groups. The modified polyisocyanates can be mixed with one another or with unmodified polyisocyanates.

Organic polyisocyanates which have been found to be particularly useful are diphenylmethane diisocyanate isomer mixtures or crude MDI having a diphenylmethane diisocyanate isomer content of from 33 to 55% by weight.

b) Compounds which have at least two isocyanate-reactive hydrogen atoms and can be used together with the active hydrogen-containing compounds of formula I employed according to the present invention are compounds which have two or more reactive groups selected from among OH groups, SH groups, NH groups, $NH_2$ groups and CH-acid groups, eg. β-diketo groups, in the molecule.

Use is advantageously made of those having a functionality of from 2 to 8, preferably from 2 to 6, and a molecular weight of from 300 to 8000, preferably from 400 to 4000. Compounds which have been found to be useful are, for example, polyetherpolyamines and/or preferably polyols selected from the group consisting of polyether polyols, polyester polyols, polythioether polyols, polyesteramides, hydroxyl-containing polyacetals and hydroxyl-containing aliphatic polycarbonates or mixtures of at least two of the polyols mentioned. Preference is given to using polyester polyols and/or polyether polyols. The hydroxyl number of the polyhydroxyl compounds is generally from 100 to 850 and preferably from 200 to 600.

Suitable polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of suitable dicarboxylic acids are: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either individually or in admixture with one another. In place of the free dicarboxylic acids, it is also possible to use the corresponding dicarboxylic acid derivatives such as dicarboxylic esters of alcohols having from 1 to 4 carbon atoms or dicarboxylic anhydrides. Examples of dihydric and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane.

To prepare the polyester polyols, the organic, eg. aromatic and preferably aliphatic, polycarboxylic acids and/or derivatives and polyhydric alcohols can be polycondensed in the absence of catalysts or preferably in the presence of esterification catalysts, advantageously in an atmosphere of inert gas such as nitrogen, carbon monoxide, helium, argon, etc., in the melt at from 150° to 250° C., preferably from 180° to 220° C., under atmospheric pressure or under reduced pressure to the desired acid number which is advantageously less than 10, preferably less than 2.

To prepare the polyester polyols, the organic polycarboxylic acids and/or derivatives and polyhydric alcohols are advantageously polycondensed in a molar ratio of 1:1–1.8, preferably 1:1.05–1.2.

The polyester polyols obtained preferably have a functionality of from 2 to 4, in particular from 2 to 3, and a molecular weight of from 300 to 3000, preferably from 350 to 2000 and in particular from 400 to 600.

However, the polyols used are particularly preferably polyether polyols which are prepared by known methods, for example from one or more alkylene oxides having from 2 to 4 carbon atoms in the alkylene radical by anionic polymerization using alkali metal hydroxides such as sodium or potassium hydroxide or alkali metal alkoxides such as sodium methoxide, sodium or potassium ethoxide or potassium isopropoxide as catalysts with addition of at least one initiator molecule containing from 2 to 8, preferably from 2 to 6, reactive hydrogen atoms in bound form, or by cationic polymerization using Lewis acids such as antimony pentachloride, boron fluoride etherate, etc., or bleaching earth as catalysts.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures. Suitable initiator molecules are, for example: water, organic dicarboxylic acids such as succinic acid, adipic acid, phthalic acid and terephthalic acid, aliphatic and aromatic, unalkylated, N-monoalkylated, N,N- and N,N'-dialkylated diamines having from 1 to 4 carbon atoms in the alkyl radical, eg. unalkylated, monoalkylated and dialkylated ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine.

Further suitable initiator molecules are: alkanolamines such as ethanolamine, N-methylethanolamine and N-ethylethanolamine, dialkanolamines such as diethanolamine, N-methyldiethanolamine and N-ethyldiethanolamine, and trialkanolamines such as triethanolamine, and ammonia. Preference is given to using polyhydric, in particular dihydric, trihydric and/ or higher-hydric, alcohols such as ethanediol, 1,2- and 1,3-propanediol, diethylene glycol, dipropylene glycol, 1,4-butanediol, 1,6-hexanediol, glycerol, trimethylolpropane, pentaerythritol and sucrose.

The polyether polyols, preferably polyoxypropylene polyols and polyoxypropylene-polyoxyethylene polyols, have a functionality of preferably from 2 to 6 and in particular from 2 to 4 and molecular weights of from 300 to 8000, preferably from 400 to 1500 and in particular from 420 to 1100, and suitable polyoxytetramethylene glycols have a molecular weight up to about 3500.

Further suitable polyether polyols are polymer-modified polyether polyols, preferably graft polyether polyols, in particular those based on styrene and/or acrylonitrile which are prepared by in situ polymerization of acrylonitrile, styrene or preferably mixtures of styrene and acrylonitrile, eg. in a weight ratio of from 90:10 to 10:90, preferably from 70:30 to 30:70, advantageously in the abovementioned polyether polyols using methods similar to those described in the German Patents 11 11 394, 12 22 669 (U.S. Pat. Nos. 3,304,273, 3,383, 351, 3,523,093), 11 52 536 (GB 10 40 452) and 11 52 537 (GB 987 618), and also polyether polyol dispersions which comprise as disperse phase, usually in an amount of from 1 to 50% by weight, preferably from 2 to 25% by weight: eg. polyureas, polyhydrazides, polyurethanes containing bound tertiary amino groups and/ or melamine, and are described, for example, in EP-B-011 752 (U.S. Pat. No. 4,304,708), U.S. Pat. No. 4,374,209 and DE-A-32 31 497.

Like the polyester polyols, the polyether polyols can be used individually or in the form of mixtures. They can also be mixed with the graft polyether polyols or polyester polyols or with the hydroxyl-containing polyesteramides, polyacetals, polycarbonates and/or polyetherpolyamines.

Suitable hydroxyl-containing polyacetals are, for example, the compounds which can be prepared from glycols such as diethylene glycol, triethylene glycol, 4,4'-dihydroxyethoxydiphenyldimethylmethane or hexanediol and formaldehyde. Suitable polyacetals can also be prepared by polymerization of cyclic acetals.

Suitable hydroxyl-containing polycarbonates are those of the type known per se which can be prepared, for example, by reacting diols such as 1,3-propanediol, 1,4-butanediol and/or 1,6-hexanediol, diethylene glycol, triethylene glycol or tetraethylene glycol with diaryl carbonates, eg. diphenyl carbonate, or phosgene.

The polyesteramides include, for example, the predominantly linear condensates obtained from polybasic, saturated and/or unsaturated carboxylic acids or their anhydrides and polyfunctional saturated and/or unsaturated aminoalcohols or mixtures of polyfunctional alcohols and aminoalcohols and/or polyamines.

Suitable polyetherpolyamines can be prepared from the abovementioned polyether polyols by known methods. Examples which may be mentioned are cyanoalkylation of polyoxyalkylene polyols and subsequent hydrogenation of the nitrile formed (U.S. Pat. No. 3,267,050) or partial or complete amination of polyoxyalkylene polyols with amines or ammonia in the presence of hydrogen and catalysts (DE 12 15 373).

The open-celled rigid polyurethane foams can be produced with or without the use of chain extenders and/or crosslinkers. However, the addition of chain extenders, crosslinkers or, if desired, mixtures thereof can prove to be advantageous for modifying the mechanical properties, eg. the hardness. Chain extenders and/or crosslinkers used are diols and/or triols having molecular weights of less than 400, preferably from 60 to 300. Suitable chain extenders/crosslinkers are, for example, aliphatic, cycloaliphatic and/or araliphatic diols having from 2 to 14, preferably from 4 to 10 carbon atoms, eg. ethylene glycol, 1,3-propanediol, 1,10-decanediol, o-, m-, p-dihydroxycyclohexane, diethylene glycol, dipropylene glycol and preferably 1,4-butanediol, 1,6-hexanediol and bis(2-hydroxyethyl)hydroquinone, triols such as 1,2,4- or 1,3,5-trihydroxycyclohexane, glycerol and trimethylolpropane and low molecular weight hydroxyl-containing polyalkylene oxides based on ethylene oxide and/or 1,2-propylene oxide and the abovementioned diols and/or triols as initiator molecules.

If chain extenders, crosslinkers or mixtures thereof are employed for producing the rigid foams based on isocyanate, they are advantageously used in an amount of up to 20% by weight, preferably from 2 to 8% by weight, based on the weight of the polyol compound (b).

c) As blowing agent, preference is given to using water which eliminates carbon dioxide by reaction with the isocyanate group. The water content is, in particular, from 0.1 to 4% by weight, preferably from 0.3 to 3% by weight, particularly preferably from 0.5 to 2% by weight, based on the total mass of all hydrogen-active compounds. An excessively high water content can lead to increased brittleness and thermal conductivity of the foam.

d) In addition to water, it is also to possible to use physically acting blowing agents d). In particular, use is made of low-boiling hydrocarbons, lower monofunctional alcohols, acetals or partially halogenated hydrocarbons, known as HCFCs. Preference is given to low-boiling cyclic and acyclic saturated hydrocarbons having up to 12 carbon atoms which can be used individually or in any mixtures with one another, in particular pentanes. It is possible here to use either mixtures of pentane isomers or the pure isomers. The amount of the hydrocarbons is from 1 to 30 parts by weight, preferably from 16 to 22 parts by weight, in particular from 6 to 12 parts by weight, based on the weight of all hydrogen-active compounds.

Furthermore, it is advantageous to use perfluorinated compounds as co-blowing agents. In particular, use is made of perfluoroalkanes, preferably n-perfluoropentane, perfluorohexane, n-perfluoroheptane or n-perfluoroeoctane. The perfluorinated compounds can be used individually or in the form of mixtures. Preference is given to using them in an amount of from 0.1 to 6 parts by weight, based on the sum of the components b) to e).

Since the perfluorinated compounds are insoluble in the polyol component, they are usually emulsified in this component. As emulsifiers, preference is given to using (meth)acrylates, in particular those having fluorine-containing side chains, for example fluorinated alkyl esters.

e) Catalysts employed for producing the foams of the present invention are, in particular, those compounds which strongly accelerate the reaction of the compounds (b) containing reactive hydrogen atoms with the polyisocyanates (a). Compounds preferred for this purpose are tertiary amines, tin compounds and bismuth compounds, alkali metal carboxylates and alkaline earth metal carboxylates, quaternary ammonium salts, s-hydroxytriazines and tris(dialkylaminomethyl)-phenols.

Particular preference is given to tertiary aminoalcohols of the formula

where $R_1$ and $R_2$ are aliphatic or cycloaliphatic groups having from 1 to 15 carbon atoms or $R_1$ and $R_2$ together form a single cycloaliphatic ring having from 3 to 15 carbon atoms and the nitrogen atom in the ring, and $R_3$ is an aliphatic chain having from 1 to 15 carbon atoms. The carbon chains or rings of $R_1$, $R_2$ and $R_3$ can also containing heteroatoms such as sulfur or in particular oxygen in the chain.

Preferably, $R_1$ and $R_2$ together with the nitrogen atom form a piperidine, pyrrolidine, imidazole or morpholine structure, an alkaloid of the pyrrolidine/piperidine type or a bicyclic compound, eg. an azanorbornane.

An example which may be mentioned is the compound

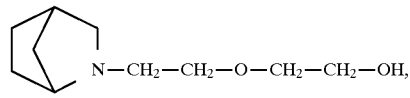

as is marketed by Air Products.

To form isocyanurate structures in the foam, use is made of the catalysts customary for this purpose, eg. metal carboxylates, for example potassium acetate, and other substances as are described, for example, in the Kunststoff-Handbuch, Volume VII, Polyurethane, 3rd Edition 1993, on page 108.

The catalysts are preferably employed in an amount of from 0.1 to 10 parts by weight based on 100 parts by weight of the compounds b), c), d) and e).

Further auxiliaries and/or additives are, for example, surface-active substances, foam stabilizers, cell regulators, flame retardants, fillers and hydrolysis inhibitors.

Further details regarding the abovementioned and further starting materials may be found in the specialist literature, for example the monograph by H. J. Saunders and K. C. Frisch, "High Polymers", Volume XVI, Polyurethanes Parts 1 and 2, Interscience Publishers 1962 and 1964 or the Kunststoffhandbuch, Volume VII, Polyurethane, Carl Hanser Verlag, Munich, Vienna, 1st, 2nd and 3rd Editions 1966, 1983 and 1993.

To produce the novel rigid foams based on isocyanate, the polyisocyanates are reacted with the compounds containing hydrogen atoms which are reactive toward isocyanates and, if desired, partly with themselves. The components b) to e) are usually combined to form the polyol component before the reaction.

In the simplest case, the polyol component can be combined with the polyisocyanate by stirring. However, it is customary to carry out the foaming in a machine. Here, the components are combined in mixing heads and then introduced into a mold.

The foams of the present invention usually have an open cell content of 50–100%. Their density is preferably from 30 to 100 kg/m$^3$, in particular from 50 to 65 kg/m$^3$. The foams of the present invention are preferably used for filling hollow spacers which are subsequently evacuated, eg. walls and/or doors of refrigerators, storage containers, motor vehicle structures, long-distance heating pipes or sandwich elements, in particular as core material for vacuum insulation units.

For this purpose, the foam cores are enclosed in a film so as to be gastight and are then evacuated. The film used here is preferably a multilayer film.

The film is usually sealed by welding, and the welding seam, like the entire film, has to be impermeable.

The pressure within the vacuum insulation elements is usually from 0.001 to 10 mbar. In order to bind the last traces of gases, it is advantageous to use getters known per se.

The process of the present invention makes it possible to produce rigid polyurethane foams having an open cell content of up to 100%. The vacuum insulation elements manufactured from the rigid foams produced according to the present invention have good mechanical properties and a significantly lower thermal conductivity than products of the prior art.

The invention is illustrated by the following examples.

EXAMPLES 1 TO 13

Formative components used

Polyol 1: Polyether polyol having a hydroxyl number of 470 mg KOH/g, a molecular weight of 470 and a functionality of 3.9, prepared by reacting ethylenediamine with propylene oxide.

Polyol 2: Polyether polyol having a hydroxyl number of 490 mg KOH/g, a molecular weight of 490 and a functionality of 4.3, prepared by reacting a mixture of sucrose, glycerol and water with propylene oxide.

Polyol 3: Polyether polyol having a hydroxyl number of 555 mg KOH/g, a molecular weight of 1800 and a functionality of 3.0, prepared by reacting trimethylolpropane with propylene oxide.

Polyol 4: Polyesterol derived from glycerol and castor oil and having a hydroxyl number of 500 mg KOH/g.

Polyol 5: Polyesterol derived from monoethylene glycol and tall oil fatty acid and having a hydroxyl number of 161 mg KOH/g.

Polyol 6: Polyesterol derived from trimethylolpropane and tall oil fatty acid and having a hydroxyl number of 293 mg KOH/g.

Polyol 7: Polyesterol derived from glycerol and tall oil fatty acid and having a hydroxyl number of 310 mg KOH/g.

Polyol 8: Polyesterol derived from glycerol and castor oil and having a hydroxyl number of 357 mg KOH/g.

Polyol 9: Polyesterol derived from adipic acid/phthalic anhydride/oleic acid/trimethylolpropane and having a hydroxyl number of 385 mg KOH/g and a molecular weight of 530.

Polyol 10: Polyether polyol having a hydroxyl number of 35 mg KOH/g, a molecular weight of 3980 and a functionality of 2.5, prepared by reacting glycerol with ethylene oxide and propylene oxide.

Polyol 11: Polyether polyol having a hydroxyl number of 400 mg KOH/g, a molecular weight of 420 and a functionality of 3.0, prepared by reacting glycerol with propylene oxide.

Lupranat M 20 A: Mixture of diphenylmethane diisocyanates and polyphenylpolymethylene polyisocyanates having an NCO content of 31.5% by weight.

Lupranat M 50: Mixture of diphenylmethane diisocyanates and polyphenylpolymethylene polyisocyanates having an NCO content of 31.0% by weight.

Tegostab B8919: Cell opener (Goldschmidt)
Ortegol 501: Cell opener (Goldschmidt)
Tegostab B8863Z: Foam stabilizer (Goldschmidt)
Tegostab B8870: Foam stabilizer (Goldschmidt)
Tegostab B8461: Foam stabilizer (Goldschmidt)
Tegostab B8409: Foam stabilizer (Goldschmidt)
FC 430: Fluorinated alkyl ester (3 M Deutschland GmbH)
Dabco AN 20: Catalyst (Air Products)
Lupragen N 301: Catalyst (BASF AG)
Lupragen VP 9104: Catalyst (BASF AG)
UAX 6164: Cell opener (OSI)

The polyol and isocyanate components indicated in Tables 1–4 were mixed and allowed to foam freely in open molds having dimensions of 400×700×90 mm.

Test specimens having dimensions of 190/190/20 mm were sawn from the foam blocks, packed in a gastight film and the latter was, after evacuation to final pressures of 0.05 mbar, sealed by welding.

The thermal conductivity was determined using a "Hesto-Lambda-Control-A-50" instrument.

The open cell content was determined in accordance with ASTM D 2856-87, method B.

TABLE 1

| Polyol component | Example 1 (C) | Example 2 | Example 3 |
|---|---|---|---|
| Polyol 1 | 20 | 20 | 20 |
| Polyol 2 | 30 | 20 | 40 |
| Polyol 3 | 50 | 50 | 30 |
| Polyol 4 |  | 10 | 10 |
| B8919 | 3 | 3 | 3 |
| B8863Z | 1 | 1 | 1 |
| FC 430 | 1 |  | 1 |
| Dabco AN 20 | 5 | 5 | 5 |
| Water | 0.5 | 2.3 | 0.5 |
| Cyclopentane | 7 |  | 7 |
| Perfluorohexane | 4 |  | 4 |
| Polyisocyanate component | | | |
| M 20 A | 144 | 145 | 147 |
| Density (g/l) | 55.3 | 54.7 | 55.0 |
| Open cell content (%) | 83 | 100 | 100 |
| TC (mW/mK) at 0.1 mbar | 13 | 7.5 | 7.0 |

(C) = Comparative example
The amounts indicated are parts by weight

TABLE 2

| Polyol component | Example 4 | Example 5 | Example 6 | Example 7 |
|---|---|---|---|---|
| Polyol 1 | 15 | 15 | 15 | 10 |
| Polyol 2 | 17.5 | 22.5 | 20 | 10 |
| Polyol 3 | 41 | 36 | 40 | 43 |
| Polyol 7 | 5 | | | 14 |
| Polyol 5 | | | 5 | |
| Polyol 6 | | | | |
| B 8919 | 3 | 3 | 3 | 4.5 |
| B 8863 Z | 1 | 1 | 1 | 1.4 |
| FC 430 | 1 | 1 | 1 | |
| Dabco AN 20 | 5 | 5 | 5 | 2.8 |
| Water | 0.5 | 0.5 | 0.5 | 2.2 |
| Cyclopentane | 7 | 7 | 7 | |
| Perfluorohexane | 4 | 4 | 4 | |
| Polyisocyanate component | | | | |
| M 20 A | 117 | 116 | 149 | 180 |
| Density (g/l) | 55 | 52 | 53 | 55 |
| Open cell content (%) | 95 | 71 | 73 | 96 |
| TC (mW/m*K) | 7.5 | 14 | 13 | 6.9 |

TABLE 3

| Polyol component | Example 8 | Example 9 | Example 10 | Example 11 |
|---|---|---|---|---|
| Polyol 1 | 10 | 10 | 10 | 10 |
| Polyol 2 | 10 | 10 | 10 | 10 |
| Polyol 3 | 43 | 43 | 43 | 43 |
| Polyol 8 | 12 | 12 | 12 | 12 |
| Polyol 11 | 20 | 20 | 20 | 20 |
| Ortegol 501 | | 3.6 | 3.6 | |
| B 8919 | 3.6 | | | 3.6 |
| B 8870 | 1 | 0.8 | | 1.4 |
| B 8863 Z | | | 1.4 | |
| Dabco AN 20 | 3 | 3 | 3 | 3 |
| Water | 2.5 | 2.3 | 2.3 | 2.3 |
| Polyisocyanate component | | | | |
| M 20 A | 190 | 190 | 190 | 190 |
| Density (g/l) | 59 | 58 | 59 | 60 |
| Open cell content (%) | 96 | 96 | 95 | 96 |
| TC (mW/m*K) | 7.8 | 7.5 | 8.1 | 7.3 |

TABLE 4

| Polyol component | Example 12 | Example 13 |
|---|---|---|
| Polyol 9 | 26 | 26 |
| Polyol 10 | 32 | 32 |
| Dipropylene glycol | 17 | 17 |
| B 8461 | 1.3 | 1.3 |
| B 8409 | 1.3 | 1.3 |
| B 8919 | 2 | |
| UAX 6164 | | 2 |
| Water | 0.4 | 0.4 |
| Lupragen VP 9104 | 5.1 | 5.1 |
| Lupragen N 301 | 0.3 | 0.3 |
| Cyclopentane | 18 | 18 |
| Polyisocyanate component | | |
| M 50 A | 320 | 320 |
| Density (g/l) | 64 | 61 |
| Open cell content (%) | 95.6 | 92.4 |
| TC (mW/m*K) | 6.9 | 8.1 |

We claim:

1. A process for producing open-celled rigid foams comprising reacting
    a) polyisocyanates with
    b) compounds containing hydrogen atoms which are reactive toward isocyanates, in the presence of
    c) water, and optionally
    d) organic compounds acting as physical blowing agents,
    e) catalysts, auxiliaries and additives,
wherein the compounds containing reactive hydrogen atoms comprise substances having the structure I:

$$R_1 \left\{ \begin{array}{l} \left( O-\overset{O}{\underset{\|}{C}}+(CH_2)_m \left( \underset{\underset{OH}{|}}{CH} \right)_n +CH_2\overline{)_o} +CH=CH\overline{)_p} +CH_2\overline{)_q} \right. \\ +CH=CH\overline{)_t} +CH_2\overline{)_v} \left( \underset{\underset{OH}{|}}{CH} \right)_r -CH_2)_s CH_3 \Big)_y \\ \left( O-\overset{O}{\underset{\|}{C}}+R_2\overline{)}-\overset{O}{\underset{\|}{C}}-O+R_1-O-\overset{O}{\underset{\|}{C}}-R_2-\overset{O}{\underset{\|}{C}}-O]_u R_3-OH \right)_z \\ (OH)_{z_i} \end{array} \right.$$

where m is 0–15
n is 0–1
o is 0–15
p is 0–1
q is 0–15
r is 0–1
s is 0–15
t is 0–1
u is 0–10
v is 0–15
x is 1–5
y is 1–4 or mixtures of 1–3 where r+n≠0
z is 0–3
$z_i$ is 0.1

$R_1$ is an aliphatic structure without OH groups based on the structure of polyhydric alcohols, or a mixture of the corresponding structures, $R_2$ is the radical of a polycarboxylic acid without COOH groups, and $R_3$ is an alcohol radical as described for, but independent of $R_1$.

2. A process as claimed in claim 1, wherein the compounds containing reactive hydrogen atoms comprises esterification products of natural materials and polyfunctional alcohols.

3. A process as claimed in claim 1, wherein the compounds containing reactive hydrogen atoms and having the structure I make up 0.1–80% by weight of the total compounds b) which can react with isocyanate.

4. A process as claimed in claim 1, wherein the compounds containing reactive hydrogen atoms and having the structure I make up 5–50% by weight of the total compounds b) which can react with isocyanate.

5. A process as claimed in claim 1, wherein the compounds containing reactive hydrogen atoms and having the structure I make up 10–20% by weight of the total compounds b) which can react with isocyanate.

6. A process as claimed in claim 1, wherein the compounds containing reactive hydrogen atoms comprises mixtures of compounds of the structure I with polyols having a functionality of greater than 1.5 and a hydroxyl number of from 10 mg KOH/g to 600 mg KOH/g.

7. A process as claimed in claim 1, wherein the compounds containing reactive hydrogen atoms comprises mixtures of compounds having the structure I and reaction products of trimethylolpropane and alkylene oxides.

8. A process as claimed in claim 1, further comprising reacting at least 10% of the isocyanate groups of the polyisocyanates a) to form isocyanurate groups.

9. A process as claimed in claim 1, wherein said physical blowing agents comprise alkanes.

10. A process as claimed in claim 1, wherein said physical blowing agents comprising perfluoro compounds.

11. A process as claimed in claim 1, wherein the physical blowing agents comprise perfluoro compounds in an amount of from 0.1 to 6 parts by weight, based on 100 parts by weight of the components b) to e).

12. A process as claimed in claim 1, wherein mixtures of alkanes and perfluoro compounds are used as physical blowing agents.

13. An open-celled rigid foam based on isocyanate prepared according to the process as claimed in claim 1.

14. A process as claimed in claim 1, wherein $R_1$ is selected from the group consisting of ethylene glycol, diethylene glycol, triethylene glycol, 1,2-propylene glycol and dipropylene glycol, 1,4-butanediol, 1,6-hexanediol, neopentyl glycol, 1,3-butanediol, trimethylolpropane, trimethylolethane, glycerol, pentaerythritol, and mixtures thereof.

15. A process as claimed in claim 1, wherein $R_2$ is selected from the group consisting of adipic acid, terephthalic acid, o-phthalic acid, and mixtures thereof.

* * * * *